United States Patent
Lewis

[11] 3,758,672
[45] Sept. 11, 1973

[54] MANUFACTURE OF SILICON CARBIDE

[75] Inventor: Thomas John Lewis, Bishops Stortford, England

[73] Assignee: Minister of Technology in Her Britannic Majesty's Government of the United Kingdom of Great Britain and Northern Ireland, London, England

[22] Filed: May 7, 1968

[21] Appl. No.: 727,160

[30] Foreign Application Priority Data
May 8, 1967  Great Britain............... 21,197/67

[52] U.S. Cl.............. 423/345, 23/277, 23/273, 23/284
[51] Int. Cl......................... C01b 31/36, B01j 17/02
[58] Field of Search............. 23/208 A; 117/106 C; 423/345

[56] References Cited
UNITED STATES PATENTS

| | | | |
|---|---|---|---|
| 3,346,338 | 10/1967 | Latham, Jr............. | 23/208 A |
| 3,161,473 | 12/1964 | Pultz.................... | 23/208 A |
| 3,371,995 | 3/1968 | Pultz.................... | 23/208 A |
| 3,409,395 | 11/1968 | Shyne et al............ | 23/208 A X |

OTHER PUBLICATIONS

Knippenberg, "Philips Research Reports," Vol. 18, No. 3 Pages 171–174 (June, 1963)
Schwarzkopf et al., "Refractory Hard Metals," 1953, Page 76
Schwarzkopf et al., "Refractory Hard Metals," 1953, pages 49—53
Hamilton, "Preparation and Properties of Pure Silicon Carbide," Silicon Carbide, Pergamon Press, N.Y., 1960, pp. 43–51. TK 7872 S4C 48.

*Primary Examiner*—M. Weissman
*Attorney*—Cushman, Darby & Cushman

[57] ABSTRACT

A process for the manufacture of silicon carbide whiskers comprises heating solid-phase carbon and solid-phase silicon at a temperature of at least 1,100°C, said heating being carried out in the presence of a substrate heated to a temperature of at least 1,000°C and in an atmosphere comprising hydrogen and chlorine, whereby silicon carbide whiskers are formed upon the substrate.

5 Claims, 1 Drawing Figure

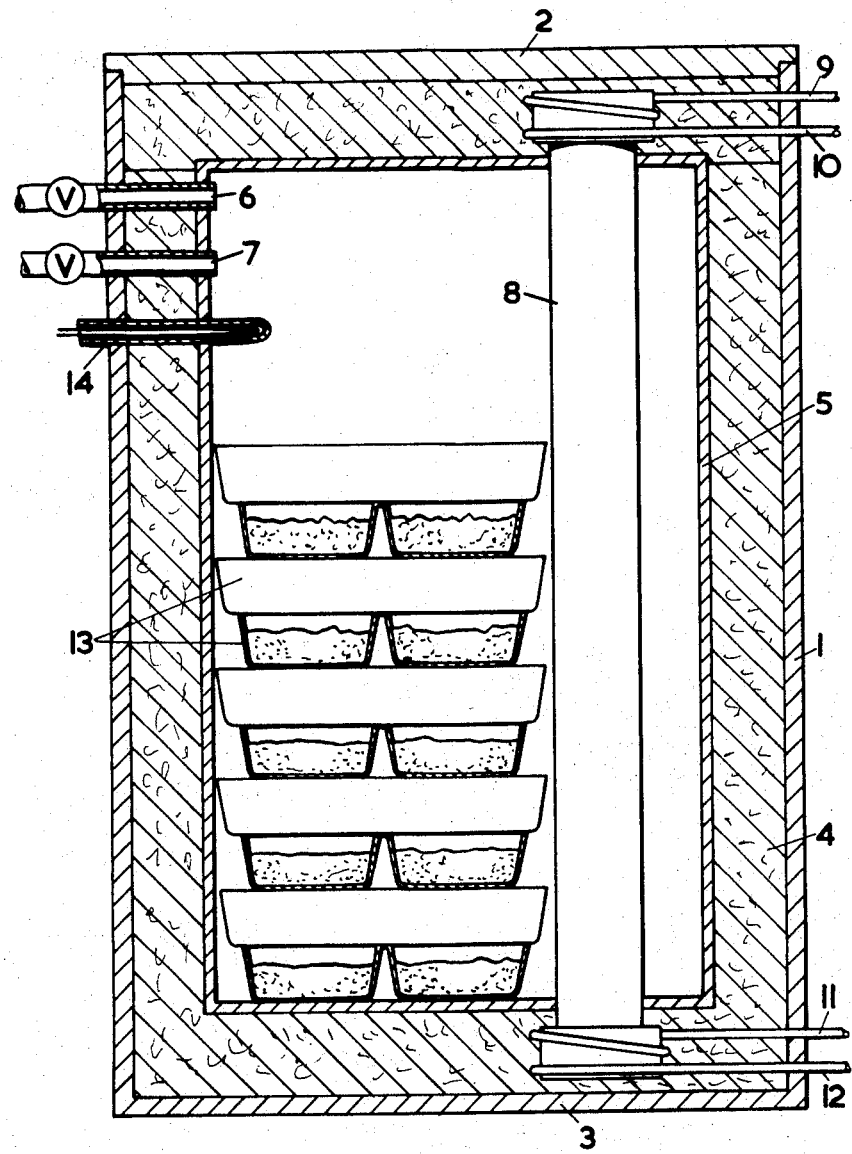

MANUFACTURE OF SILICON CARBIDE

The invention relates to improvements in the manufacture of silicon carbide in the form of elongated single crystal fibres known as whiskers. The term whisker is generally applied to any single-crystal fibre having a thickness less than about 0.1 mm. and a length to thickness ratio of at least 10.

Silicon carbide whiskers have high stiffness and tensile strength, and excellent thermal stability and these desirable properties make them very attractive as reinforcing materials for incorporation into metal and plastics matrices. Hitherto commercially viable processes for the manufacture of silicon carbide whiskers have depended upon high temperature gas-phase reactions between one or more oxides of silicon and of carbon, generally in the presence of gaseous hydrogen. In such reactions, for example, oxygen acts as a carrier gas by combining with a solid-phase source of silicon to give a volatile silicon-oxygen species which may react in the gas-phase with a volatile carbon-containing species. The silicon-oxygen species is reduced during the reaction and silicon carbide whiskers are formed and deposited upon suitable subtrates adjacent the reaction zone.

Processes involving oxygen as a carrier gas possess serious disadvantages: reaction rates are inherently slow and severely limited by the rate of diffusion of waste product gases away from the centres of reaction; and the free-energy changes in the reactions resulting in the formation of silicon carbide whiskers do not favour high yields of whiskers. Furthermore, the concentration of volatile silicon-oxygen species which can be present in the reaction zone is restricted by the fact that concentrations of oxygen higher than a certain value result in the precipitation of silicon dioxide. It has thus been necessary, in order to keep below this critical oxygen concentration and yet to obtain acceptable yields of silicon carbide whiskers, continuously to supply the volatile reacting species to the reaction zone and continuously to exhaust gaseous waste products from the reaction zone. Such a continuous system necessarily complicates the apparatus in which the process is carried out and in particular renders the design of a suitable high temperature reaction zone difficult.

It is a major object of the present invention to provide a process for the manufacture of silicon carbide whiskers in which a silicon-oxygen species is not required and in which the use of oxygen as a carrier gas, and the disadvantages peculiar to the use of oxygen in this way, are eliminated. A further aim of the invention is to produce silicon carbide whiskers by a process which may be carried out in a sealed high-temperature reaction vessel containing all the necessary starting materials and for which the apparatus may thus be considerably simpler and cheaper to design, construct and operate than for processes requiring a continuous throughput of starting materials. In addition the present invention provides a process using predominantly solid-phase starting materials which permits more economic use of the available reaction zone volume in the reaction vessel resulting in higher overall yields.

According to the invention, a process for the manufacture of silicon carbide whiskers comprises heating solid-phase carbon and solid-phase silicon at a temperature of at least 1,100°C, said heating being carried out in the presence of a substrate heated to a temperature of at least 1,000°C and in an atmosphere comprising hydrogen and chlorine, whereby silicon carbide whiskers are formed upon the substrate. The chlorine component of the atmosphere in the reactor may be provided by introducing chlorine gas, or, alternatively, a chlorine-containing compound which will decompose to release chlorine or a reactive chlorine-containing species at or below the temperature at which the solid-phase reactants are heated. Suitable chlorine-phase reactants are heated. Suitable chlorine-containing compounds include hydrogen chloride and carbon tetrachloride. Under the conditions of the process the chlorine component of the atmosphere will be present mainly as hydrogen chloride gas irrespective of the form in which the chlorine component is introduced into the reactor. Wherever referred to herein, the chlorine component of the atmosphere includes elemental chlorine and/or chlorine combined in the complex mixture of chlorine-containing gases which are normally present under the process conditions. This complex mixture will in fact be predominantly hydrogen chloride gas.

Although the hydrogen component would normally be provided by introducing hydrogen gas into the reactor, the hydrogen may possibly be provided by a hydrogen-containing compound, such as hydrogen chloride.

A process in accordance with the invention is conveniently carried out in a sealed high temperature reactor such as the hot zone of a furnace and it is necessary merely to introduce the solid-phase reactants and the required gaseous atmosphere into such a sealed reactor and bring the reactor to the appropriate operating temperature. The volume of the reactor is preferably considerably larger than the volume of the solid-phase reactants introduced in order that transport and gas-phase reaction of volatile silicon-containing and carbon-containing species involved in the whisker forming process may take place and that adequate substrate area to accommodate the whisker product is available.

The atmosphere in the reactor need not consist exclusively of hydrogen and the chlorine component and may contain, for example, if desired, one or more of the inert gases in Group 0 of the Periodic Table. However, best yields are generally obtained when hydrogen and chlorine are substantially the only constituents of the atmosphere. The proportion of the chlorine component should normally represent at least 1% by volume of the total gaseous atmosphere. Proportions above 5% generally do not significantly improve the rate of reaction or the yield of silicon carbide whiskers and therefore, although proportions above 5% may be used, there is normally no advantage in this. Proportions below 1% are normally insufficient to give optimum yields of silicon carbide whiskers. The small proportion of chlorine component required is due to the continuous regeneration of chlorine involved in the whisker-forming process throughout the course of this process so that it may react again; this represents an important advantage of the present invention.

The proportion of the hydrogen component should normally represent at least 10% of the total atmosphere and may advantageously comprise the whole of the balance of the gaseous atmosphere not due to the chlorine component.

Suitable substrates are those upon which the nucleation and growth of silicon carbide whiskers may take place readily. Typically, useful substrates are refractory materials such as alumina, silicon nitride, silicon carbide, mullite, carbon and silica. Although the substrate will normally be in the massive, solid state, this is not essential and for example fibrous carbon in the form of carbon cloth may be used. The substrate is conveniently provided as an inner lining to the high temperature reactor, but also it may be distributed, either alternatively or in addition, within the reaction zone of the reactor. Carbon represents a particularly convenient substrate since it also acts as a source of one of the solid-phase reactants required in the whisker-forming process.

The preferred temperature for heating the solid-phase reactants is between 1,250°C – 1,350°C. Temperatures above about 1,600°C do not significantly increase the whisker yield and are both more expensive to maintain, and tend to shorten the lift of reactors in which the process is carried out.

The physical form of the solid-phase reactants is not critical, but they are preferably finely divided to allow the maximum rate of reaction. Similarly, the proportions in which the solid-phase reactants are provided are not critical, but clearly an equimolar ratio is to be preferred. In general, the whisker-forming reaction is not affected seriously by variations from the preferred proportions of carbon, silicon and hydrogen, provided that the required minor proportion of chlorine is present, reaction will continue until either the carbon or silicon is exhausted or the available substrate area is covered with silicon carbide whiskers.

The time for which the whisker forming process is continued directly affects the yield of products. Generally, increasing the time of heating increases the yield provided that sufficient reactants are available, but the increase in yield is generally less than proportional to the increase for time of heating for times of heating longer than about 10 hrs.

Pressures greater than atmospheric have the effect of increasing the concentration of gas-phase reactants in the reaction zone and can be expected to result in an increased yield of product compared with a similar process carried out at atmospheric pressure. The pressure must not, of course, be high enough to cause fundamental changes in the crystal structure of the silicon carbide formed and so prevent the production of whiskers.

The precise mechanism by which silicon carbide whiskers are formed in a process in accordance with the invention is not fully understood but it may be analoguous to the mechanism proposed by Wagner and Ellis (Trans. Met. Soc. A.I.M.E., 233, 1053, (1965)) for the formation of silicon whiskers and called by them Vapour-Solid-Liquid (V.L.S.) theory. Briefly, the V.L.S. theory proposes that nucleation of silicon whiskers takes place at the sites of minute concentrations of molten metals or alloys present in the substrate and that the further formation and extension of a whisker outwardly from the substrate takes place in this molten material which is maintained at the tip of the growing whisker. Analysis of silicon carbide whiskers produced by the present invention shows that the majority of whiskers have at the tip a metallic knob comprising an alloy of iron and silicon, sometimes in combination with nickel, titanium and other metals, and this is consistent with a V.L.S. type of whisker formation. Generally, adequate concentrations of such metals would be present inevitably in one or more of the materials used in a process according to the invention, particularly in the refractories used as substrate materials and refractory brick nomally used as thermal insulation for the high temperature reactor.

In practice, it has been found that particularly good yields of silicon carbide whiskers may be obtained when silica and iron are present, generally in a combined form. In this context, it should be noted that the preferred substrate, mullite, is an alumino-silicate having the empirical formula $3\ Al_2\ O_3·2\ SiO_2$ which often contains iron oxide.

A typical high temperature reactor in which the manufacture of silicon carbide whiskers may be carried out in accordance with the invention will now be described with reference to the accompanying drawing which shows a vertical cross-sectional view through the reactor. The reactor described provides a large reaction zone in which the silicon carbide whiskers may be formed and the reactor may be scaled up to any desired size. The reaction zone illustrated in the drawing is cylindrical and has a volume of about 2.5 cu. ft.

The reactor comprises an outer casing consisting of a cylinder 1 having end faces 2 and 3. The inner sides of the casing are lined with thermal insulating material 4, and may have further lining 5, consisting of carbon in the form of carbon cloth. Feed pipes 6 and 7 pass through the wall of the outer casing and allow gases to be passed into, and removed from, the interior of the furnace.

A carbon heating electrode 8 is fitted within the casing and copper pipes 9, 10, 11 and 12 are provided to pass electric current through the carbon electrode and at the same time to allow cooling water to be circulated around each end of the electrode.

A number of ceramic trays 13 normally made of mullite or carbon are stacked within the reaction zone to contain one or both of the solid-phase reactants.

Temperatures within the outer casing may be monitored continuously by a thermocouple 14 and the whisker product may be removed from the apparatus by removing the end face 2 which is constructed in the form of a lid.

In carrying out a process in accordance with the invention in the reactor described, the solid-phase reactants need only to be distributed within the reaction zone. In general, however, the closer the solid-phase reactants the shorter are the diffusion paths of the species involved in the whisker growing process and the higher are the yields obtained. Both solid-phase reactants may be placed in the trays 13 or, where a carbon lining 5 is provided, only silicon need be placed in the trays.

A typical example of the manufacture of silicon carbide whiskers in accordance with the invention carried out in the high temperature reactor hereinbefore described is as follows:

The high temperature reactor is provided with a lining 5 composed of carbonised rayon, and mullite trays 13, containing finely-divided (200 B.S.S. mesh) silicon, are loaded into the reaction zone. The reactor is closed with the end face 2 and evacuated to as low a pressure as possible. The source of chlorine, in this case carbon tetrachloride, is allowed to evaporate into the reactor via feed pipe 6. Hydrogen is then introduced into the cold reactor, in a proportion sufficient to ensure that total gas pressure is about atmospheric when the furnace is operating at the desired temperature. Electric current is then passed through electrode 8 and the reactor is brought as quickly as possible to the operating temperature of 1,345°C. Heating is continued for 14 hours and at the end of this time 50 g. of a greenish-white mass of silicon carbide whiskers are formed on the carbon lining and on the mullite tray surfaces.

Although the invention has been illustrated with reference to processes carried out within a sealed reactor which offers advantages in case of construction and operation, it will be appreciated that processes according to the invention could be carried out in a continuous flow of the hydrogen and chlorine atmosphere. Also the substrate itself could be continuously removed from the reaction zone, whiskers harvested and the substrate returned to the reaction zone.

I claim:

1. A process for the manufacture of silicon carbide whiskers which comprises heating solid elemental carbon and solid elemental silicon at a temperature of between 1,100° and 1,600°C, said heating being carried out in the presence of a nucleation substrate selected from the group consisting of alumina, silicon nitride, silicon carbide, mullite, carbon or silica, said substrate being heated to a temperature of between 1,000° and 1,600°C, and in an atmosphere containing a chlorine component and a hydrogen component and wherein the chlorine component constitutes at least 1 percent by volume of the atmosphere and the hydrogen component constitutes between about 10 and 99% by volume of the atmosphere and in which substantially any part not consisting of the chlorine component and the hydrogen component is an inert gas, whereby silicon carbide whiskers are formed upon the said substrate.

2. A process according to claim 1 wherein the chlorine component is provided as a chlorine containing compound selected from the group consisting of hydrogen chloride and carbon tetrachloride.

3. A process according to claim 1 wherein the carbon and silicon are physically separate.

4. A process according to claim 1 in which the silicon and the carbon are heated between 1,250° and 1,350°C.

5. A process according to claim 1 in which the substrate contains iron in elemental or combined form.

* * * * *